Feb. 7, 1928. 1,658,526
A. KAUFMANN
CARRIAGE BODY WALL, ESPECIALLY FOR MOTOR CARS
Filed Dec. 2, 1926
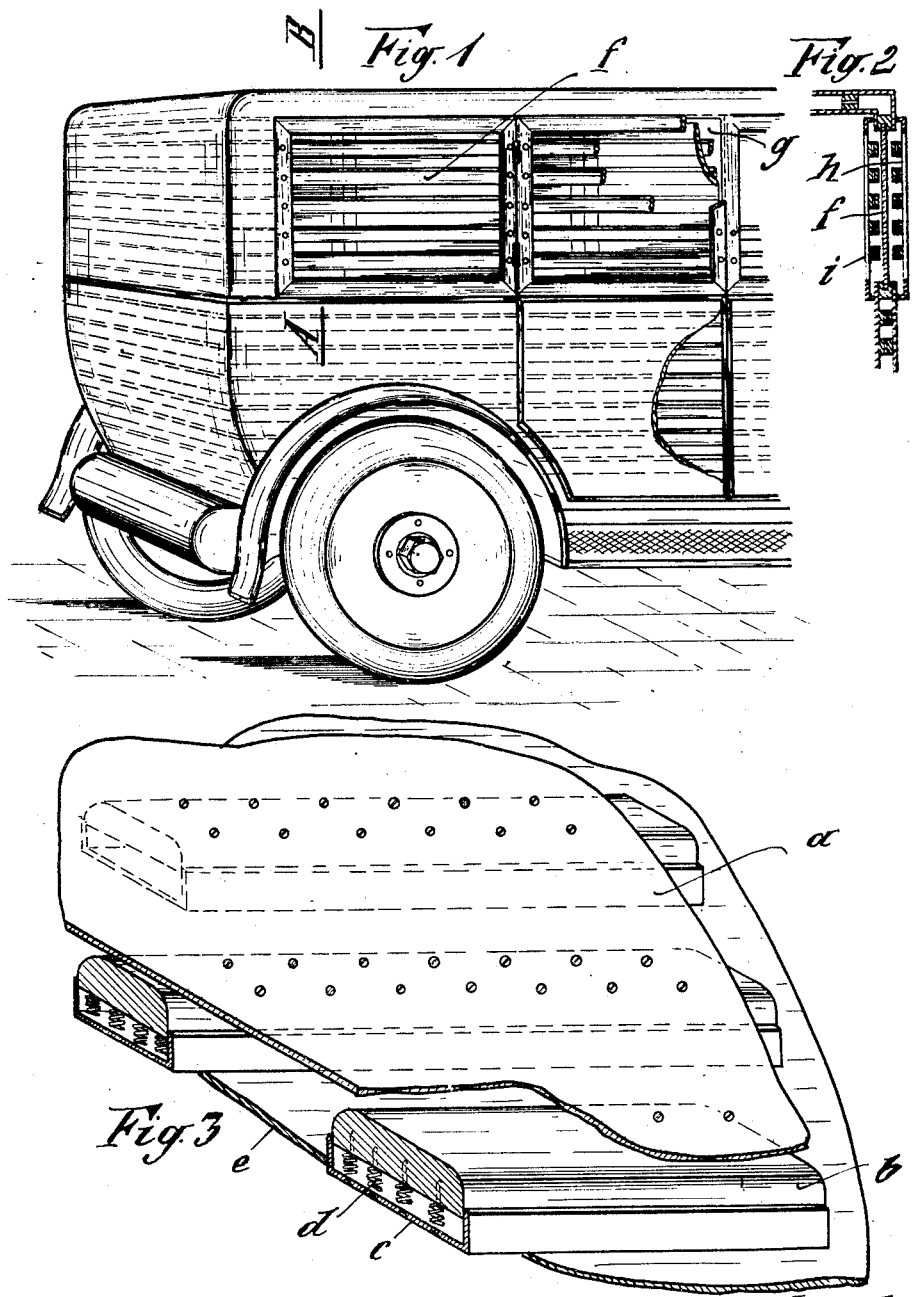

Patented Feb. 7, 1928.

1,658,526

UNITED STATES PATENT OFFICE.

ALBERT KAUFMANN, OF WILDUNGEN, GERMANY.

CARRIAGE-BODY WALL, ESPECIALLY FOR MOTOR CARS.

Application filed December 2, 1926, Serial No. 152,213, and in Germany June 26, 1926.

My invention relates to a carriage body wall, especially for motor cars, and its object is to intercept and dampen the shocks arising when the carriage or car should have a collision or meet with a similar accident. While the object of this is to prevent in general the persons inside the car from being hurt, another object is to prevent the car itself from being more or less severely damaged, also as regards the panes, so that pieces of broken glass cannot hurt said persons.

The invention is illustrated diagrammatically and by way of example on the accompanying drawing on which Figure 1 is a perspective view of the rear half of a motor car having walls designed according to this invention; Figure 2 is a section in line A—B of Fig. 1, and Figure 3 shows some details, viz, the new arrangement and combination of parts proper, drawn to a greatly enlarged scale relatively to Figs. 1 and 2.

On the drawing, $a$ denotes the outer covering and $e$ the inner one. Between the two coverings are strong iron bars $b$ located and guided in U-bars $c$ and having its free edges rounded and being retained in the bars $c$ by helical springs $d$ connected at one end with said bars $b$ and at the other end with said bars $c$, the bars $b$ being, therefore, supported elastically in the bars $c$ and adapted to intercept or take up and dampen eventually arising shocks; this is true of outside shocks, as well as of inside ones.

I wish it to be understood that the springs $d$ may be connected with the bars $b$ and $c$ in any desired manner, and that instead of helical spring leaf or plate springs may be employed.

A plurality of such combination bars as $b\ c\ d$ is arranged in the body walls of the car, preferably in horizontal position, as in Fig. 1, and the members $c$ of them are firmly connected with the framing of the car body whereas the outer covering $a$ is attached to them; the inner covering $e$ is attached to the bars $b$; there may be coverings of any suitable kind, may be (as regards the inner one) combined with an upholstery so that the persons inside the car are securely prevented from being hurt in the case of an accident, and also the car body is well protected.

It is, of course, possible to affix the U-bars $c$ or the combination bars $b\ c\ d$ to frames having the size and shape of the four sides of the car body and being then connected with each other in order to form that body. Those sides may be flat or plane, or curved, i. e. forming a concave curve or a convex one, as the case may be.

Combination protective bars like $b\ c\ d$ are to be provided also at the panes of the body walls, the doors and the front wall, preferably inside and outside, as in Figs. 1 and 2. $f$, Figs. 1 and 2 denote panes in the lateral body walls, and $g$ denotes a door pane. $h$ denotes the frame to which the inner combination bars are attached, and $i$ denotes the frame to which the outer combination bars are attached, as shown by way of example in Fig. 2.

I wish it to be understood that I do not limit myself to the constructional form of the invention as shown merely by way of example on the accompanying drawing and described in the above specification. It is possible to design various other constructional forms based upon the same inventive idea and constituting no departure from the same.

I claim:

1. In a carriage body, especially a motor car body, in combination with the inner and the outer covering: combination bars comprising each a rigid member firmly secured to the body framing, another rigid member supported by the first and guided by it, and resilient means arranged between said two members; a plurality of said combination bars being arranged between said coverings, substantially as set forth.

2. In a carriage body, especially a motor car body, in combination with the inner and the outer covering: combination bars comprising each a rigid member firmly secured to the body framing, another rigid member supported by the first and guided by it, and resilient means arranged between said two members; a plurality of said combination bars being arranged between said coverings and outside and inside at the panes, substantially as set forth.

3. In a carriage body, especially a motor car body, in combination with the inner and the outer covering: combination bars comprising each an outer rigid member of U-section secured to the body framing, another rigid member supported and guided by it and having its free edges rounded, and a plurality of helical springs located between said two members and connecting them with each other, substantially as set forth.

In testimony whereof I affix my signature.

ALBERT KAUFMANN.